(12) United States Patent
Norimatsu

(10) Patent No.: US 9,056,523 B2
(45) Date of Patent: Jun. 16, 2015

(54) WHEEL BEARING APPARATUS PROVIDED WITH A ROTATIONAL SPEED DETECTING APPARATUS

(71) Applicant: NTN Corporation, Osaka-shi (JP)

(72) Inventor: Takayuki Norimatsu, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/894,632

(22) Filed: May 15, 2013

(65) Prior Publication Data

US 2013/0249273 A1     Sep. 26, 2013

Related U.S. Application Data

(63) Continuation of application No. PCT/JP2011/076249, filed on Nov. 15, 2011.

(30) Foreign Application Priority Data

Nov. 16, 2010     (JP) .................................. 2010-255554

(51) Int. Cl.
*F16C 32/00*     (2006.01)
*F16C 41/04*     (2006.01)
*F16C 13/00*     (2006.01)
(Continued)

(52) U.S. Cl.
CPC ......... *B60B 27/0068* (2013.01); *B60B 27/0084* (2013.01); *B60B 2380/73* (2013.01); *B60B 2380/92* (2013.01); *B60B 2900/141* (2013.01); *G01P 3/443* (2013.01); *G01P 3/487* (2013.01); *F16C 33/723* (2013.01); *F16C 41/007* (2013.01); *F16C 19/186* (2013.01); *B60B 27/0005* (2013.01); *F16C 2326/02* (2013.01); *F16C 33/768* (2013.01); *B60B 7/0013* (2013.01); *B60B 2310/316* (2013.01)

(58) Field of Classification Search
CPC .... F16C 19/186; F16C 33/723; F16C 41/007; F16C 2326/02; B60B 27/0073; B60B 27/0068; B60B 27/0005; G01P 3/443
USPC .................................. 384/448, 489, 544, 589
See application file for complete search history.

(56) References Cited

U.S. PATENT DOCUMENTS 6,217,220 B1     4/2001   Ohkuma et al.
6,254,276 B1 *   7/2001   Ouchi et al. ................... 384/448
(Continued)

FOREIGN PATENT DOCUMENTS

JP     2004-354299 A     12/2004
JP     2005-133953 A     5/2005
JP     2005-249180 A     9/2005
JP     2009-150421 A     7/2009
WO    WO2011034134      *  3/2011

*Primary Examiner* — James Pilkington
(74) *Attorney, Agent, or Firm* — Harness, Dickey & Pierce, P.L.C.

(57) ABSTRACT

A wheel bearing apparatus has a cup-shaped cap that is coated by a preserving film and mounted on an outer member. The cap is press-formed from non-magnetic steel sheet. The cap has a cylindrical fitting portion, a disk portion and a bottom portion. The cylindrical fitting portion is press-fit into the inner circumference of the inner-side end of the outer member. The disk portion extends radially inward from the fitting portion and opposes a pulser ring, via a small axial gap. The bottom portion extends from the disk portion, via a bent portion, to cover the inner-side end of the inner member. The rotational speed sensor is arranged opposite the pulser ring, via the disk portion of the cap, where the rotational speed sensor is closely arranged to the pulser ring.

10 Claims, 12 Drawing Sheets

(51) Int. Cl.
*B60B 27/00* (2006.01)
*G01P 3/44* (2006.01)
*G01P 3/487* (2006.01)
*F16C 33/72* (2006.01)
*F16C 41/00* (2006.01)
*F16C 33/76* (2006.01)
*B60B 7/00* (2006.01)
*F16C 19/18* (2006.01)

(56) References Cited

U.S. PATENT DOCUMENTS

| | | |
|---|---|---|
| 8,210,750 B2 * | 7/2012 | Shige et al. .................. 384/448 |
| 8,382,377 B2 * | 2/2013 | Yamamoto et al. ........... 384/448 |
| 8,393,795 B2 * | 3/2013 | Aritake et al. ................ 384/489 |
| 2006/0002644 A1 * | 1/2006 | Mitsue et al. ................. 384/448 |
| 2007/0172164 A1 * | 7/2007 | Takada .......................... 384/448 |

* cited by examiner

WHEEL BEARING APPARATUS PROVIDED WITH A ROTATIONAL SPEED DETECTING APPARATUS

CROSS-REFERENCE TO RELATED APPLICATIONS

This application is a continuation of International Application No. PCT/JP2011/076249, filed Nov. 15, 2011, which claims priority to Japanese Application No. 2010-255554, filed Nov. 16, 2010. The disclosures of the above applications are incorporating herein by reference.

FIELD

The present disclosure generally relates to a wheel bearing apparatus that rotatably supports a wheel of a vehicle, such as an automobile, with respect to a suspension apparatus. More particularly, it relates to a wheel bearing apparatus with a rotational speed detecting apparatus to detect wheel speed of a vehicle and is intended to improve the sealability of the wheel bearing.

BACKGROUND

A wheel bearing apparatus with a rotational speed detecting apparatus is generally known that can support a wheel of a vehicle with respect to a suspension apparatus. Also, the wheel bearing apparatus detects a rotation speed of a wheel of vehicle to control the anti-lock braking system (ABS). Such a bearing apparatus generally includes a sealing apparatus arranged between the inner and outer members that rotates relative to each other, via rolling elements contained between them. The rotational speed detecting apparatus includes a magnetic encoder with magnetic poles alternately arranged along its circumference integrally formed with the sealing apparatus. A rotational speed sensor detects change of magnetic poles of the magnetic encoder caused by the rotation of a wheel.

In general, the rotational speed sensor is mounted on a knuckle after the wheel bearing apparatus has been mounted on the knuckle, forming part of a suspension apparatus. Recently, a wheel bearing apparatus with a rotational speed detecting apparatus has been proposed. Here, a rotational speed sensor is also contained within a wheel bearing in order to reduce the whole size of the wheel bearing apparatus and to eliminate the complexity of the adjustment of an air gap between the rotational speed sensor and a magnetic encoder.

A structure shown in FIG. 13 is one example of the wheel bearing apparatus with a rotational speed detecting apparatus. This wheel bearing apparatus has an outer member 51, secured on a knuckle (not shown), that forms a stator member. An inner member 52 is inserted into the outer member 51, via double row balls 53, 53. The inner member 52 has a wheel hub 55 and an inner ring 56 fit onto the wheel hub 55.

The outer member 51 has an integrally formed body mounting flange 51b. The outer member 51 inner circumference is formed with double row outer raceway surfaces 51a, 51a. The inner member 52 is formed with double row inner raceway surfaces 55a, 56a on its outer circumference. The double row inner raceway surfaces 55a, 56a are arranged opposite to the outer member double row outer raceway surfaces 51a, 51a. One inner raceway surface 55a, of the double row inner raceway surfaces 55a, 56a, is formed on the outer circumference of the wheel hub 55. The other double row inner raceway surfaces 55a, 56a is formed on the outer circumference of the inner ring 56. The inner ring 56 is press-fit onto a cylindrical portion 55b that axially extends from the inner raceway surface 55a of the wheel hub 55. The double row balls 53, 53 are contained between the outer and inner raceway surfaces and rollably held by cages 57, 57.

The wheel hub 55 has, on its one end, a wheel mounting flange 54 to mount a wheel (not shown). The inner ring 56 is axially immovably secured by a caulked portion 58. The caulked portion 58 is formed by plastically deforming radially outward the end of the cylindrical portion 55b. The outer-side end of the outer member 51 has a seal 59. The inner-side end of the outer member 51 has a cover 63 to prevent leakage of lubricating grease contained in the wheel bearing and the entry of rain water or dust into the wheel bearing from outside.

An encoder 60 is press-fit onto the outer circumference of the inner ring 56. The encoder 60 has an annular supporting member 61 formed from magnetic metal sheet. The supporting member 61 has a substantially L-shaped cross-section. An encoder body 62 is adhered to the side surface of the annular supporting member 61. The encoder body 62 is formed as a permanent magnet from rubber blended with ferrite powder. The encoder body 62 has N and S poles alternately arranged along its circumference.

The cover 63 is formed of synthetic resin with a lidded cylindrical configuration. Its cylindrical portion 63a is press-fit into the inner circumference of the inner-side end of the outer member 51. Its lid portion 63b closes an open end of the outer member 51. The cylindrical portion 63a is integrally formed with a flange 64 that enables exact positioning of the whole cover 63 relative to the outer member 51. Thus, this easily controls the position of a sensor 69 mounted on the cover 63.

As shown in FIG. 14, the lid portion 63b of the cover 63 is integrally formed with a cylindrical sensor mounting portion 65. An insertion portion 69a of the sensor 69 is inserted into a sensor mounting bore 66 formed in the sensor mounting portion 65. In addition, a metal core 67, of the lidded cylindrical configuration, is integrally molded with the cover 63 over a region from the inner circumference of the cylindrical portion 63a to the inside surface of the lid portion 63b. The metal core 67 has a cylindrical portion 67a integrally molded with the cover cylindrical portion 63a. Also, it includes a lid portion 67b that forms a bottom portion of the cylindrical portion 67a. An opening portion of the sensor mounting bore 66, opposing the encoder body 62, is closed by the metal core lid portion 67b.

The metal core 67 is formed of non-magnetic steel sheet material with a thickness of about 0.3 mm. The lid portion 67b increases the strength of the cover 63. The non-magnetic material does not give any adverse influence to the detecting accuracy of the rotational speed.

The sensor 69 has a synthetic resin body and is mounted on the cover 63 by inserting the inserting portion 69a into the cover sensor mounting bore 66. The inserting portion 69a contains a detecting portion and a tip end. The detecting portion (not shown) detects a variation of magnetic flux generated by rotation of the magnetic encoder 60 at a position near the tip end of the inserting portion 69a. The tip end of the inserting portion 69a is arranged opposite to the encoder body 62, via a predetermined axial gap, sandwiching the metal core lid portion 67b therebetween. Signals from the detecting portion are output via a cable 68.

Since the opening portion of the cover sensor mounting bore 66, opposing the encoder body 62, is closed by the metal core lid portion 67b, a path for foreign matter entering into the inside of the wheel bearing apparatus is substantially eliminated. Thus, the sealability of the whole bearing apparatus is improved. See, Japanese Patent No. 4286063 (also published as JP2004-354299).

In such a wheel bearing apparatus with a rotational speed detecting apparatus of the prior art, sometimes separations (peelings) or small cracks are caused in the joined portions due to the difference in the coefficient of thermal expansion between the metal core 67 and the synthetic resin cover 63. The joined portions are between the metal core cylindrical portion 67a and the cover cylindrical portion 63a as well as the joined portion between the metal core lid portion 67b and the cover lid portion 63b. Thus, it is difficult to maintain the initial sealability for a long term.

SUMMARY

It is, therefore, an object of the present disclosure to provide a wheel bearing apparatus with a rotational speed detecting apparatus that can solve the problems of the prior art. Thus, it improves the reliability of the wheel bearing apparatus.

To achieve the above mentioned object, a wheel bearing apparatus with a rotational speed detecting apparatus comprises an outer member and inner member. The outer member is integrally formed with a body mounting flange on its outer circumference. The body mounting flange mounts onto a knuckle. The outer member inner circumference has double row outer raceway surfaces. The inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member is formed with double row inner raceway surfaces on its outer circumference. The double row inner raceway surfaces oppose the double row outer raceway surfaces. Double row rolling elements are contained between the inner raceway surfaces and outer raceway surfaces of the inner member and outer member. A pulser ring is adapted to fit onto the outer circumference of the inner ring. The pulser ring has magnetic characteristics alternately and equidistantly varying along its circumferential direction. A cup-shaped sensor cap, press-formed of steel sheet, is fit onto the inner-side end of the outer member. A rotational speed sensor is mounted on the sensor cap at a radially outer position. The rotational speed sensor is arranged opposite to the pulser ring, via a predetermined axial air gap. The cup-shaped cap is coated by a preserving film and mounted onto the outer member. The cap is press-formed from non-magnetic steel sheet. It has a cylindrical fitting portion press-fit into the inner circumference of the inner-side end of the outer member. A disk portion extends radially inward from the fitting portion and opposes the pulser ring via a small axial gap. A bottom portion extends from the disk portion, via a bent portion, to cover the inner-side end of the inner member. The rotational speed sensor is arranged opposite the pulser ring, via the disk portion of the cap, where the rotational speed sensor is closely arranged.

The wheel bearing apparatus with a rotational speed detecting apparatus includes a pulser ring adapted to fit onto the outer circumference of the inner ring. The pulser ring has magnetic characteristics alternately and equidistantly varying along its circumferential direction. A cup-shaped sensor cap, press-formed from steel sheet, is fit onto the inner-side end of the outer member. A rotational speed sensor is mounted on the sensor cap at a radially outer position. The rotational speed sensor is arranged opposite the pulser ring, via a predetermined axial air gap. The cup-shaped cap is coated by preserving film and mounted onto the outer member. The cap is press-formed from non-magnetic steel sheet. The cap has a cylindrical fitting portion press-fit into the inner circumference of the inner-side end of the outer member. A disk portion extends radially inward from the fitting portion and opposes the pulser ring, via a small axial gap. A bottom portion extends from the disk portion, via a bent portion, to cover the inner-side end of the inner member. The rotational speed sensor is arranged opposite to the pulser ring, via the disk portion of the cap, where the rotational speed sensor is closely arranged. Thus, it is possible to improve the workability during assembly of the wheel bearing while eliminating the complexity of adjusting an air gap between the rotational speed sensor and a magnetic encoder. Also, it is possible to tightly seal the inside of the wheel bearing with the cap. In addition, the sealability of the fitting portion can be improved by the preserving film coated on the cap. Thus, it is possible to provide a wheel bearing apparatus with a rotational speed detecting apparatus that can improve the reliability of the wheel bearing apparatus.

The preserving film is formed of cation electro-deposition. It is primarily coated by a phosphoric zinc treatment. Since the surface of the blank steel surface is chemically roughened by the phosphoric zinc treatment, adhesion of the preserving film to the steel surface is improved. Thus, it is possible to prevent the generation of corrosion for a long term.

An elastic member, comprised of synthetic rubber, is integrally adhered, by vulcanized coating, to the outer circumferential surface of the fitting portion of the cap. This improves the sealability of the fitting portion between the cap and the outer member.

The sheet thickness at least of the disk portion of the cap is thinner than the sheet thickness of the other portions. This enables a smaller setting of the air gap. Thus, this improves the detecting accuracy.

The air gap between the cap and the rotational speed sensor is set in a range of 0.3 to 1.0 mm. This prevents contact of the rotational speed sensor against the cap when the wheel bearing is deformed by an applied load. Thus, this keeps stable detecting accuracy of the rotational speed sensor.

The sensor cap includes a cylindrical fitting portion to be fit onto the end of the outer member. A bottom portion extends radially inward from the fitting portion to be in close contact with the inner-side end face of the outer member. The bottom portion is formed with an insert aperture parallel with the ground. The rotational speed sensor is detachably mounted in the insert aperture. This improves the positioning accuracy of the sensor cap. Also, it suppresses the variation of the air gap between the rotational speed sensor and the pulser ring if relatively inclined conditions exist between the outer and inner members caused due to a lateral load applied by a wheel. Thus, this obtains stable detecting accuracy.

The fitting portion of the sensor cap is press-fit onto the outer circumference of the inner-side end of the outer member. An annular groove is formed on the outer circumference of the inner-side end of the outer member. The outer-side end of the fitting portion is caulked onto the annular groove. This prevents the sensor cap from axially slipping off from the outer member due to the repetitive deformations of the fitting portion due to the input load from the wheel and keeps the original air gap. In addition, the amount of deformation at the fitting portion of the outer member, due to the input load from the wheel, becomes larger in the thin area of the outer member. Thus, this is unfavorable to prevent the member from axially slipping off. Accordingly, the caulking of the sensor cap increases the fastening force of the sensor cap. Thus, this contributes to reduction of the thickness of the outer member and accordingly the weight of the whole bearing apparatus.

The sensor cap is formed of austenitic stainless steel sheet with anti-corrosion properties. This prevents the generation of corrosion for a long term and improves the durability of the wheel bearing apparatus.

A drain is formed on the sensor cap at a corner between the fitting portion and the bottom portion, nearest to the ground. This makes it possible to effectively discharge, from the radially bottom portion, foreign matter, such as rain water, that would enter into inside of the sensor cap.

An aperture is formed on the bottom portion of the sensor cap at or near the center. A securing nut is press-fit into the aperture from the outer-side of the bottom portion. The rotational speed sensor is secured by fastening a mounting bolt onto the securing nut. This prevents the rotational speed sensor from falling off from the sensor cap by a fastening force due to cooperation of the mounting bolt and the securing nut. In this case, any axial groove around the press-fitting portion of the securing nut will prevent slippage of the nut during fastening of the mounting bolt.

The pitch circle diameter of the outer-side row of rolling elements is set larger than the pitch circle diameter of the inner-side row of rolling elements. The diameter of each rolling element of the outer-side row is set smaller than the diameter of each rolling element of the inner-side row. The number of the outer-side row of rolling element is set larger than the number of the inner-side row of rolling elements. This increases the bearing rigidity on the outer-side bearing row more than that of the inner-side bearing row. Thus, this extends the life of the wheel bearing apparatus while suppressing an increase of the dimension of the outer-side of the outer member.

The wheel bearing apparatus with a rotational speed detecting apparatus has an outer member integrally formed with a body mounting flange on its outer circumference. The body mounting flange is mounted on a knuckle. The outer member inner circumference has double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member is formed with double row inner raceway surfaces on its outer circumference. The double row inner raceway surfaces oppose the double row outer raceway surfaces. Double row rolling elements are contained between the inner raceway surfaces and outer raceway surfaces of the inner member and outer member. A pulser ring is adapted to fit onto the outer circumference of the inner ring. The pulser ring has magnetic characteristics alternately and equidistantly varying along its circumferential direction. A cup-shaped sensor cap, press-formed of steel sheet, is fit onto the inner-side end of the outer member. A rotational speed sensor is mounted on the sensor cap at a radially outer position. The rotational speed sensor is arranged opposite to the pulser ring, via a predetermined axial air gap. The cup-shaped cap is coated by a preserving film and mounted on the outer member. This is press-formed from non-magnetic steel sheet. It includes a cylindrical fitting portion press-fit into the inner circumference of the inner-side end of the outer member. A disk portion extends radially inward from the fitting portion and opposes the pulser ring, via a small axial gap. A bottom portion extends from the disk portion, via a bent portion, to cover the inner-side end of the inner member. The rotational speed sensor is arranged opposite the pulser ring, via the disk portion of the cap, where the rotational speed sensor is closely arranged. Thus, it is possible to improve the workability during assembly of the wheel bearing while eliminating the complexity of the adjustment of an air gap between the rotational speed sensor and a magnetic encoder. Also, it is possible to tightly seal the inside of the wheel bearing by the cap. In addition, the sealability in the fitting portion can be improved by the preserving film coated on the cap. Thus, it is possible to provide a wheel bearing apparatus with a rotational speed detecting apparatus that can improve the reliability of the wheel bearing apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A wheel bearing apparatus with a rotational speed detecting apparatus includes an outer member integrally formed with a body mounting flange on its outer circumference. The body mounting flange is mounted on a knuckle. The outer member inner circumference includes double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member is formed with double row inner raceway surfaces on its outer circumference. The double row inner raceway surfaces oppose the double row outer raceway surfaces. Double row rolling elements are contained between the inner raceway surfaces and outer raceway surfaces of the inner member and outer member. A pulser ring is adapted to fit onto the outer circumference of the inner ring. The pulser ring has magnetic characteristics alternately and equidistantly varying along its circumferential direction. A cup-shaped sensor cap, press-formed from steel sheet, is fit onto the inner-side end of the outer member. A rotational speed sensor is mounted on the sensor cap at a radially outer position. The rotational speed sensor is arranged opposite to the pulser ring, via a predetermined axial air gap. The cup-shaped cap is coated with a preserving film and mounted on the outer member. The cap is press-formed from non-magnetic steel sheet. The cap includes a cylindrical fitting portion, a disk portion and a bottom portion. The cylindrical portion is press-fit into the inner circumference of the inner-side end of the outer member. The disk portion extends radially inward from the fitting portion and opposes the pulser ring, via a small axial gap. The bottom portion extends from the disk portion, via a bent portion, to cover the inner-side end of the inner member. The rotational speed sensor is arranged opposite to the pulser ring, via the disk portion of the cap, where the rotational speed sensor is closely arranged. The air gap between the cap and the rotational speed sensor is set in a range of 0.3 to 1.0 mm.

Preferred embodiments of the present disclosure will be described with reference to the accompanied drawings.

Figure 1:
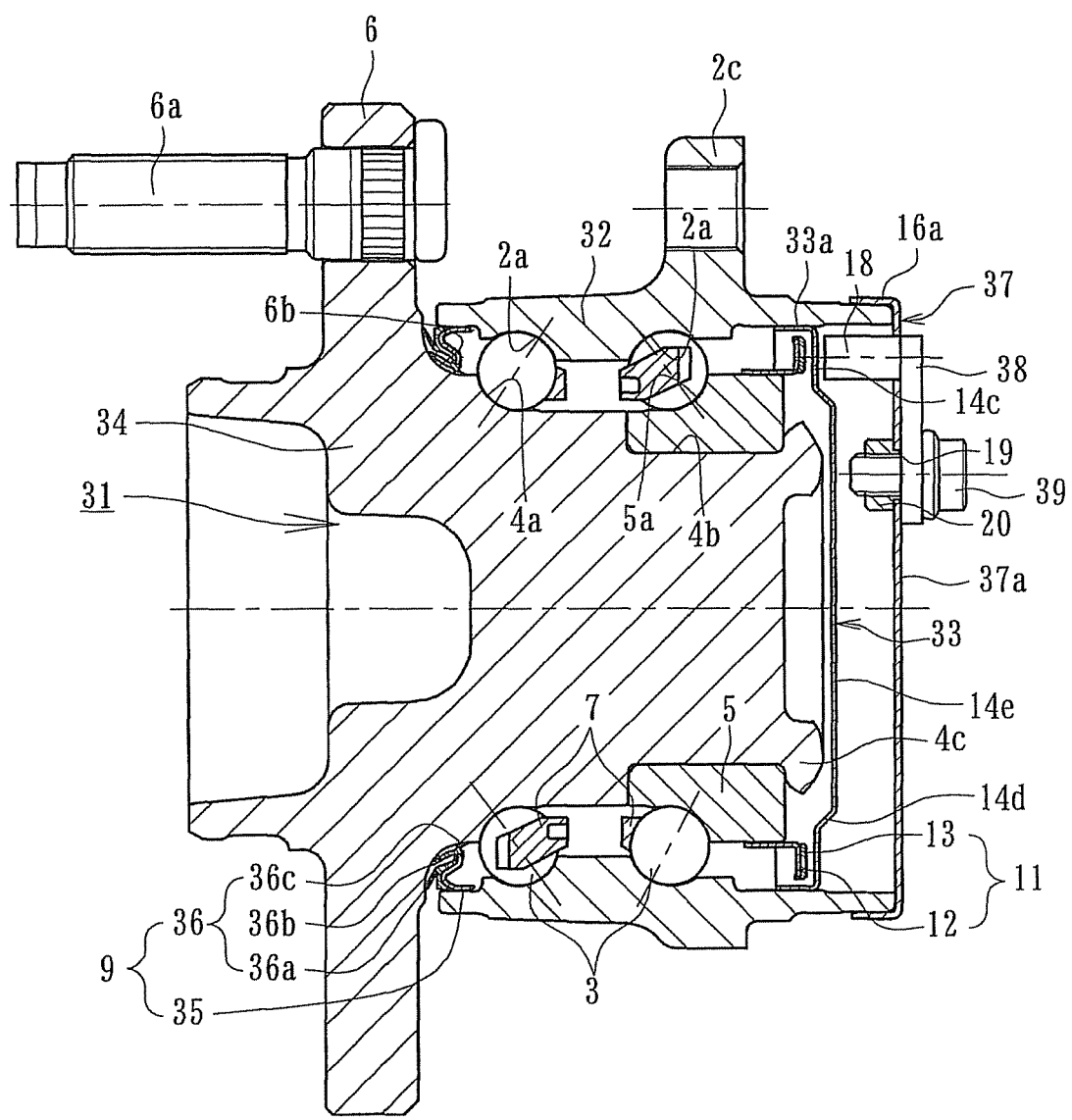
FIG. 1 is a longitudinal-section view of a first embodiment of a wheel bearing apparatus with a rotational speed detecting apparatus.
Figure 2:
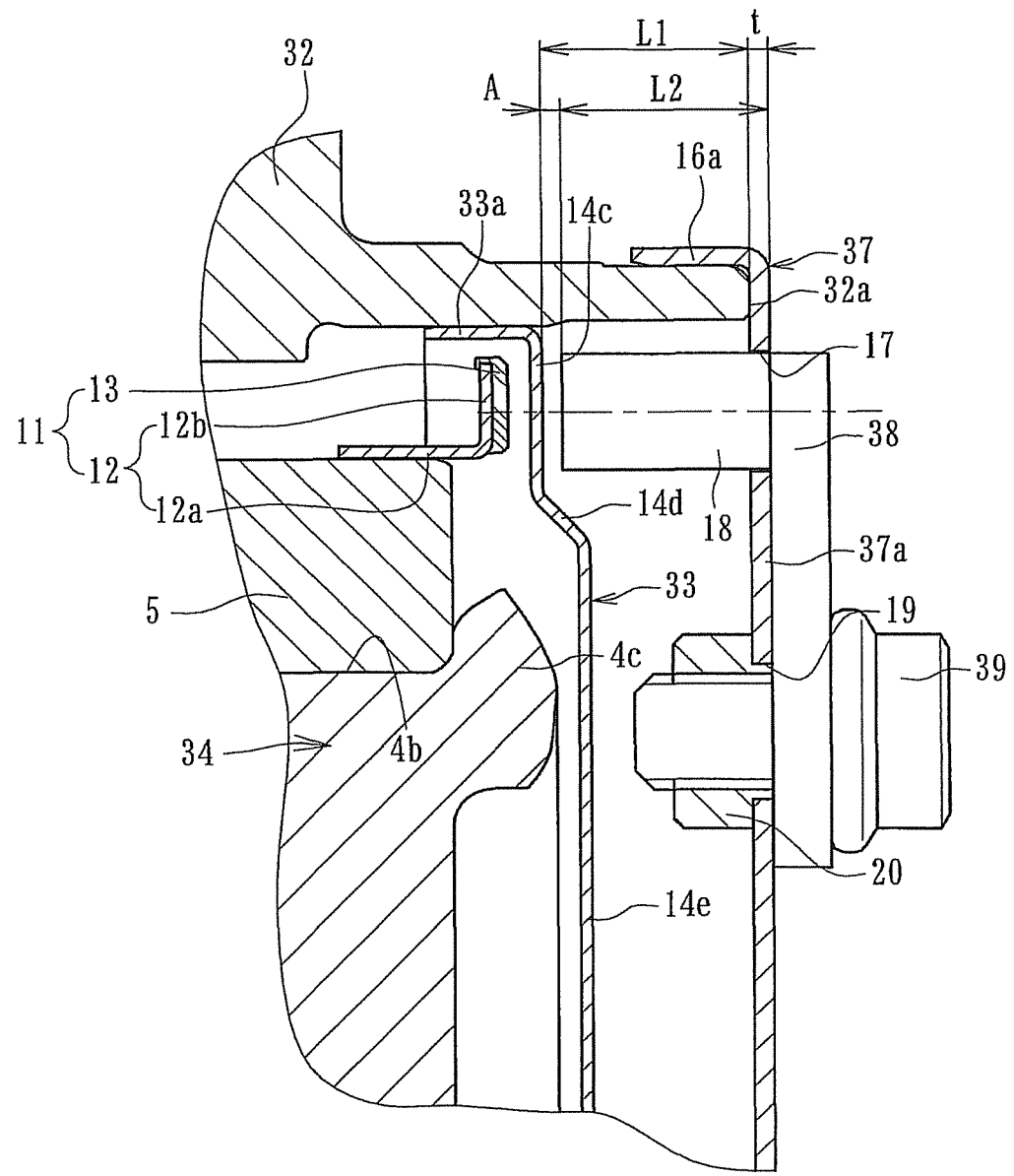
FIG. 2 is a partially enlarged view of a detecting portion of FIG. 1.

FIG. 1 is a longitudinal-section view of a first embodiment of a wheel bearing apparatus with a rotational speed detecting apparatus. FIG. 2 is a partially enlarged view of a detecting portion of FIG. 1. In the description below, an outer-side of a bearing apparatus, when it is mounted on a vehicle, is referred to as the "outer-side" (a left side in a drawing). An inner-side of a bearing apparatus, when it is mounted on a vehicle, is referred to as the "inner side" (a right side in a drawing).

The wheel bearing apparatus with a rotational speed detecting apparatus of FIG. 1 is a so-called "third generation" type for a driven wheel. It has an inner member 31, an outer member 32, and double row rolling elements (balls) 3, 3 contained between the inner and outer members 31 and 32. The inner member 31 includes the wheel hub 34 and an inner ring 5 press-fit onto the wheel hub 34.

The wheel hub 34 is integrally formed, on its outer-side end, with a wheel mounting flange 6 to mount a wheel (not shown). The wheel hub outer circumference has one (i.e. outer-side) inner raceway surface 4a. A cylindrical portion 4b radially extends from the inner raceway surface 4a. Hub bolts 6a are secured on the wheel mounting flange 6 at its circumferentially equidistant positions.

The inner ring 5 is formed, on its outer circumference, with the other (i.e. inner-side) inner raceway surface 5a. The inner ring 5 is press-fit onto the cylindrical portion 4b of the wheel hub 34, via a predetermined interference. The inner ring 5 is axially secured on the wheel hub 34, under a condition of a predetermined bearing pre-pressure, by a caulked portion 4c. The caulked portion 4c is formed by plastically deforming the end of the cylindrical portion 4b radially outward.

The wheel hub 34 is made of medium-high carbon steel such as S53C including carbon of 0.40-0.80% by weight. It is hardened by high frequency induction hardening to have a surface hardness of 58 to 64 HRC over a region from an inner-side base 6b of the wheel mounting flange 6 to the cylindrical portion 4b, including the inner raceway surface 4a. The caulked portion 4c is not hardened after forging so that it has a surface hardness less than 25 HRC. The inner ring 5 and the rolling elements 3 are formed of high carbon chrome steel such as SUJ2. They are hardened to their cores to have a hardness of 58 to 64 HRC.

Outer member 32 is formed, on its outer circumference, with a body mount flange 2c to be mounted on a knuckle (not shown). The outer member inner circumference includes double row outer raceway surfaces 2a, 2a. The double row outer raceway surfaces 2a, 2a correspond to the double row inner raceway surfaces 4a, 5a of the inner member 31. Similar to the wheel hub 34, the outer member 32 is formed from medium-high carbon steel such as S53C including carbon of 0.40 to 0.80% by weight. It is hardened by high frequency induction hardening to have a surface hardness of 58 to 64 HRC. The double row rolling elements 3, 3 are contained between the outer and inner double row outer raceway surfaces 2a, 2a; 4a, 5a and rollably held therein by cages 7, 7.

A seal 9 is mounted on the outer-side annular opening formed by the outer member 32 and the inner member 31. A cap 33 is mounted on the inner-side annular opening. The seal and cap close and seal the annular openings to prevent leakage of lubricating grease sealed within the bearing and the entry of rain water or dust from the outside into the bearing.

Although shown here the wheel bearing apparatus is formed with a double row angular contact ball bearing using balls as the rolling elements 3, the present disclosure is not limited to such a bearing. Thus, a double row tapered roller bearing using tapered rollers as the rolling elements 3 may be used. In addition, although the bearing is shown here as a third generation type, the present disclosure can be applied to a so-called second generation type bearing where a pair of inner rings is press-fit onto the wheel hub.

The outer-side seal 9 is formed as an integrated seal with a metal core 35 press-fit into the outer-side end of the outer member 32, via a predetermined interface. A sealing member 36 is adhered to the metal core 35, via vulcanized adhesion. The metal core 35 is press-formed from austenitic stainless steel sheet (JIS SUS 304 etc) or cold rolled steel sheet (JIS SPCC etc.) to have a substantially L-shaped cross-sectional configuration.

The sealing member 36 is formed from synthetic rubber such as NBR (acrylonitrile-butadiene rubber) etc. The sealing member 36 has a side lip 36a in sliding-contact with the inner-side surface of the wheel mounting flange 6, via a predetermined interference. A dust lip 36b is in sliding-contact with the base 6b circular arc cross-section, via a predetermined interference. A grease lip 36c is in sliding-contact with the base 6b, via a predetermined interference.

Examples of material for the sealing member 36, other than NBR, are HNBR (hydrogenation acrylonitric-butadiene rubber), EPDM (ethylene propylene rubber), ACM (poly-acrylic rubber) superior in heat and chemical resistance, FKM (fluororubber) or silicone rubber.

A pulser ring 11 is press-fit onto the outer circumference of the inner ring 5. This pulser ring 11 has an annular supporting member 12 with an L-shaped cross-section. It is press-formed from a steel plate such as ferritic stainless steel sheet (JIS SUS 430 etc.) or preserved cold rolled steel sheet. A magnetic encoder 13 is integrally adhered to the inner-side surface of the annular supporting member 12 via vulcanized adhesion.

As shown in the enlarged view of FIG. 2, the annular supporting member 12 includes a cylindrical fitting portion 12a and a standing portion 12b. The cylindrical fitting portion 12a is press-fit onto the outer circumference of the inner ring 5. The standing portion 12b extends radially outward from the fitting portion 12a. The magnetic encoder 13 is integrally adhered to the standing portion 12b. The magnetic encoder 13 is formed from an elastomer, such as synthetic rubber into which ferritic magnetic powder is mingled. Thus, N and S poles are alternately arranged along its circumference to form a rotary encoder to detect the rotation of a wheel.

Although the magnetic encoder 13 shown here is formed from a rubber magnet, it is possible to use other kinds of encoders such as a steel sheet pulser ring steel sheet formed with a plurality of through apertures or irregularities or formed from sintered alloy or where a plastic magnet plate is adhered.

The inner-side opening of the outer member 32 is closed by a cap 33. The cap 33 is press-fit into the inner circumference of inner-side end of the outer member 32. In order to prevent the detecting performance of the rotational speed sensor 18 from being adversely effected by the cap 33, the cap 33 is formed from non-magnetic steel sheet. The steel sheet may be austenitic stainless steel sheet with anti-corrosion properties where a preserving film is formed of cation electro-deposition and is primarily coated by phosphoric zinc treatment. The surface of the blank steel surface of the cap 33 is chemically roughened by the phosphoric zinc treatment. Thus, this improves adhesion of the preserving film to the steel surface. Thus, it is possible to prevent the generation of corrosion for a long term and to improve the sealability between the outer member 32 and the cap 33. It is possible to use, as the preserving film, anion electro-deposition coating or fluorine electro-deposition coating other than the cation electro-deposition coating.

The cap 33 includes a cylindrical fitting portion 33a, a disk portion 14c and a bottom portion 14e. The cylindrical fitting portion 33a is press-fit into the inner circumference of the inner-side end of the outer member 32. The disk portion 14c extends radially inward from the fitting portion 33a and opposes the magnetic encoder 13, via a small axial gap. The bottom portion 14e extends from the disk portion 14c, via a bent portion 14d, to cover the inner-side end of the inner member 31.

A sensor cap 37 is further mounted on the outer member 32 at an inner-side position from the cap 33. The sensor cap 37 is press-formed of austenitic stainless steel sheet with anti-corrosion properties. The cap 37 has a cup-shaped configuration where the preserving treatment, such as cation electro-deposition, is performed. The sensor cap 37 includes a cylindrical fitting portion 16a and a bottom portion 37a. The fitting portion 16a is fit onto the outer circumference of the inner-side end of the outer member 32. The bottom portion 37a closely contacts the inner-side end face 32a of the outer member 32.

The bottom portion 37a of the sensor cap 37 is formed with an insert aperture 17 in its radially outer portion. The rotational speed sensor 18 is inserted into the insert aperture 17. The rotational speed sensor 18 is embedded in synthetic resin such as PA 66. The speed sensor 18 includes an IC circuit incorporated with a magnetic detecting element and a wave form shaping circuit. The magnetic detecting element may include a Hall element, a magnetic resistance element (MR element) etc. to vary magnetic characteristics according to the flow of the magnetic flux. The waveform shaping circuit shapes the output waveform of the magnetic detecting element and forms part of the ABS of an automobile to detect the rotational speed of a wheel and control it.

An axially extending aperture 19 is formed near the insert aperture 17. A securing nut 20 is press-fit into the aperture 19 from the outer-side of the bottom portion 37a. The rotational speed sensor 18, inserted into the insert aperture 17 of the sensor cap 37, is secured by fastening a mounting bolt 39 into the securing nut 20, via a mounting member 38. The securing nut 20 may be caulked into the aperture 19 of the sensor cap 37.

The rotational speed sensor 18 is arranged to be close to the disk portion 14c of the cap 33. This improves the workability during assembly of the wheel bearing while eliminating the complexity of the adjustment of an air gap between the rotational speed sensor 18 and the magnetic encoder 13. Also, it tightly seals the inside of the wheel bearing by the cap 33. Thus, it is possible to provide a wheel bearing apparatus with a rotational speed detecting apparatus that can improve its reliability. In addition, the cap 33 is press-fit into the inner circumference of the end of the outer member 32. Thus, it is possible to increase the rigidity of the cap 33 itself as compared with that press-fit onto the outer circumference of the outer member 32. Also, the sealability of the fitting portion between the cap 33 and the outer member 32 is increased due to the preserving film coated on the cap 33.

In FIG. 2, an air gap A (an axial gap between the cap 33 and the rotational speed sensor 18) is set within a range of 0.3 to 1.0 mm. If the air gap A is less than 0.3 mm, this would cause contact of the rotational speed sensor 18 with the cap 33 when the bearing is deformed by an applied load. If the air gap A exceeds 1.0 mm, then it would make the detecting ability of the rotational speed sensor 18 unstable.

The range of the air gap A is determined by controlling each part and its assembling accuracy. For example, assuming that a press-fitting position L1 of the cap 33 is 8 mm and its interference is ±0.1 mm, a thickness t of the sensor cap 37 is 1 mm and its interference is ±0.1 mm, and a length L2 of the rotational speed sensor 18 is 8.35 mm and its interference is ±0.15, the air gap A (=L1+t−L2) will be 0.65 mm±0.35 mm. Accordingly, it is possible to set the variation of the air gap A so that it will be in a range of 0.3 to 1.0 mm.

Figure 3:
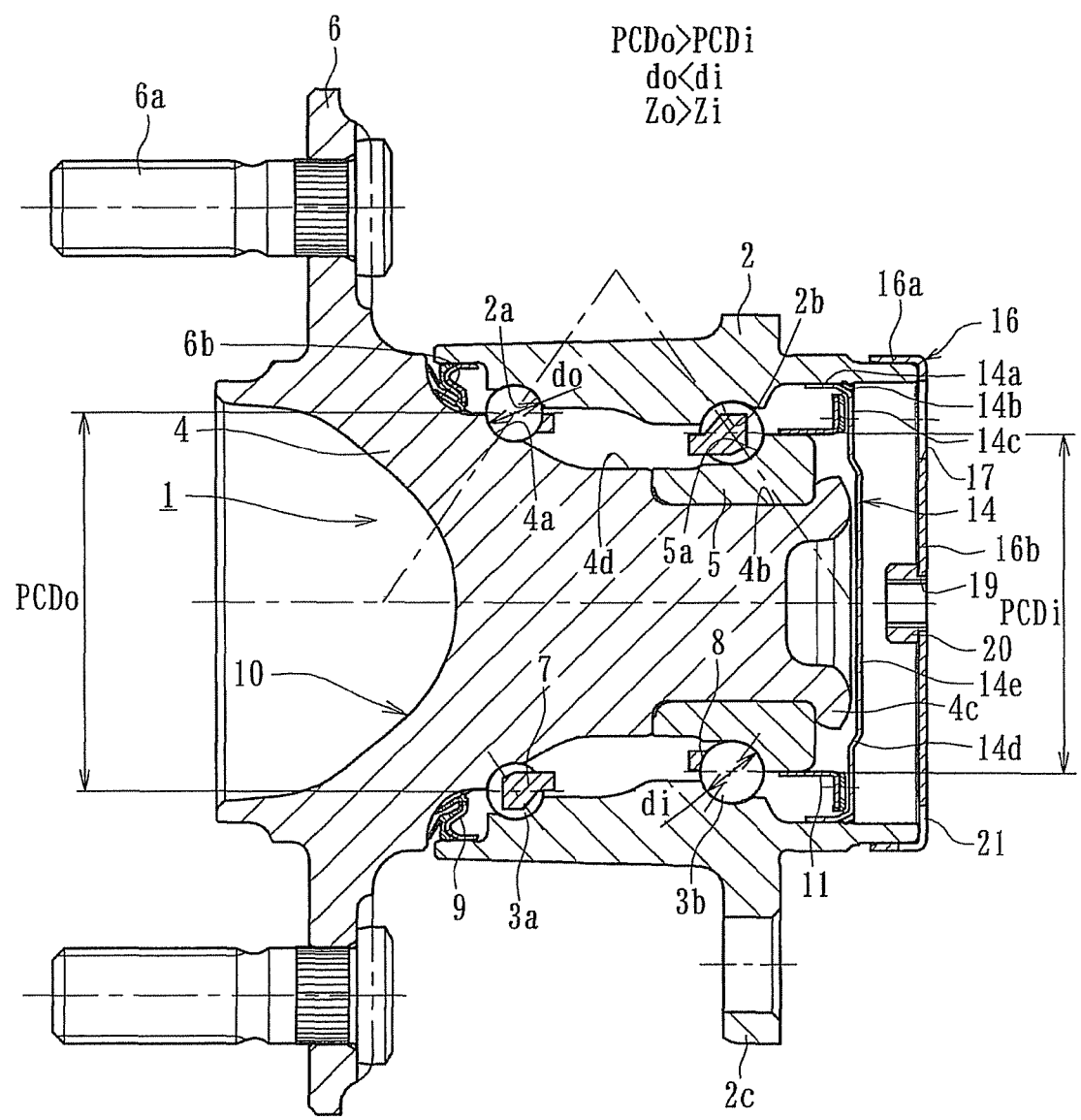
FIG. 3 is a longitudinal-section view of a second embodiment of a wheel bearing apparatus with a rotational speed detecting apparatus.
Figure 4:
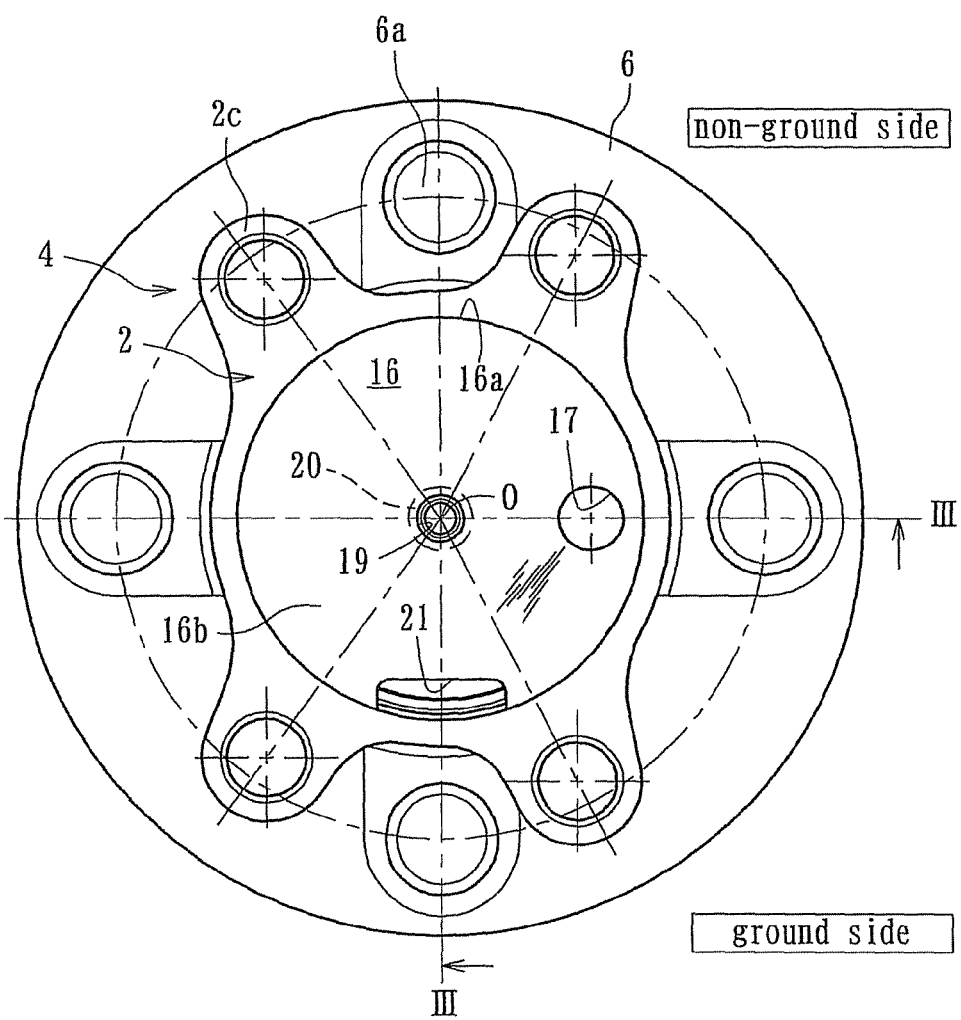
FIG. 4 is a side elevation view of FIG. 3.
Figure 5:
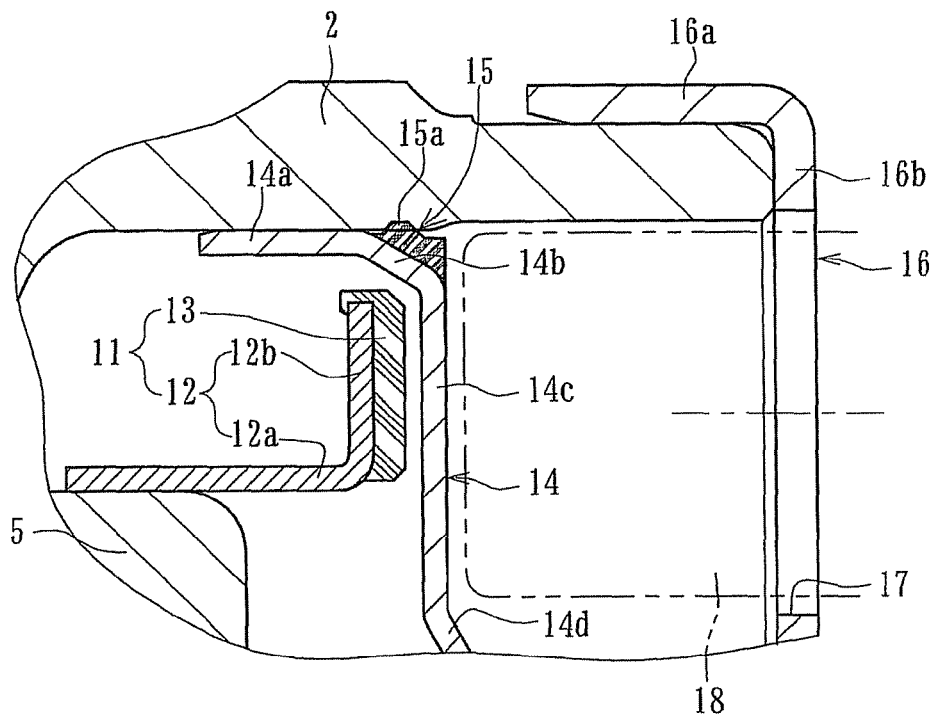
FIG. 5 is a partially enlarged view of a detecting portion of FIG. 3.
Figure 6:
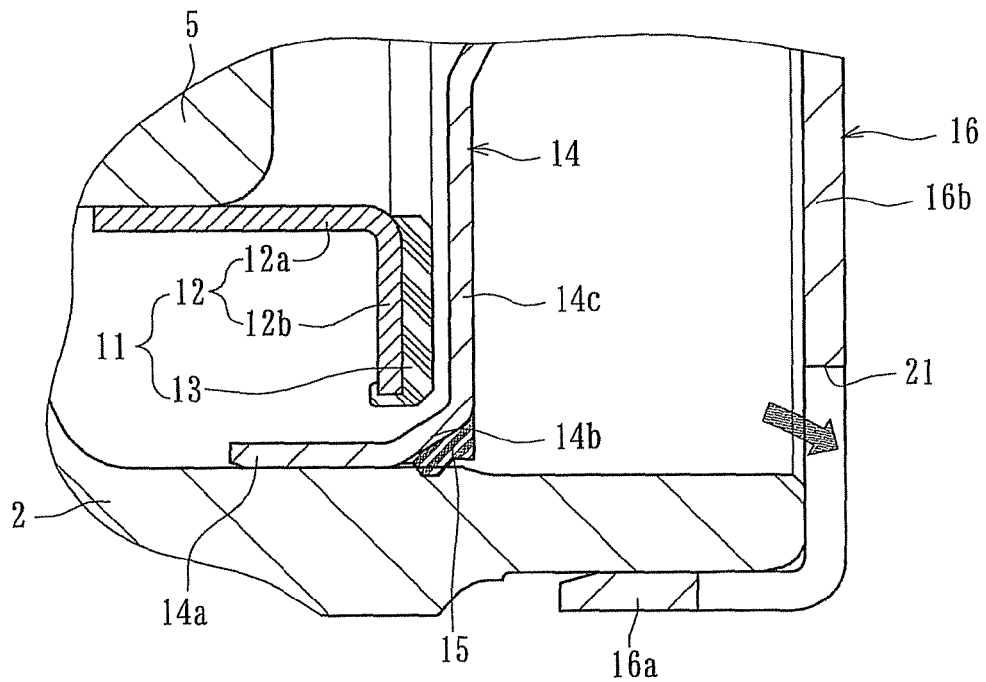
FIG. 6 is a partially enlarged view of a drain portion of FIG. 3.
Figure 7:
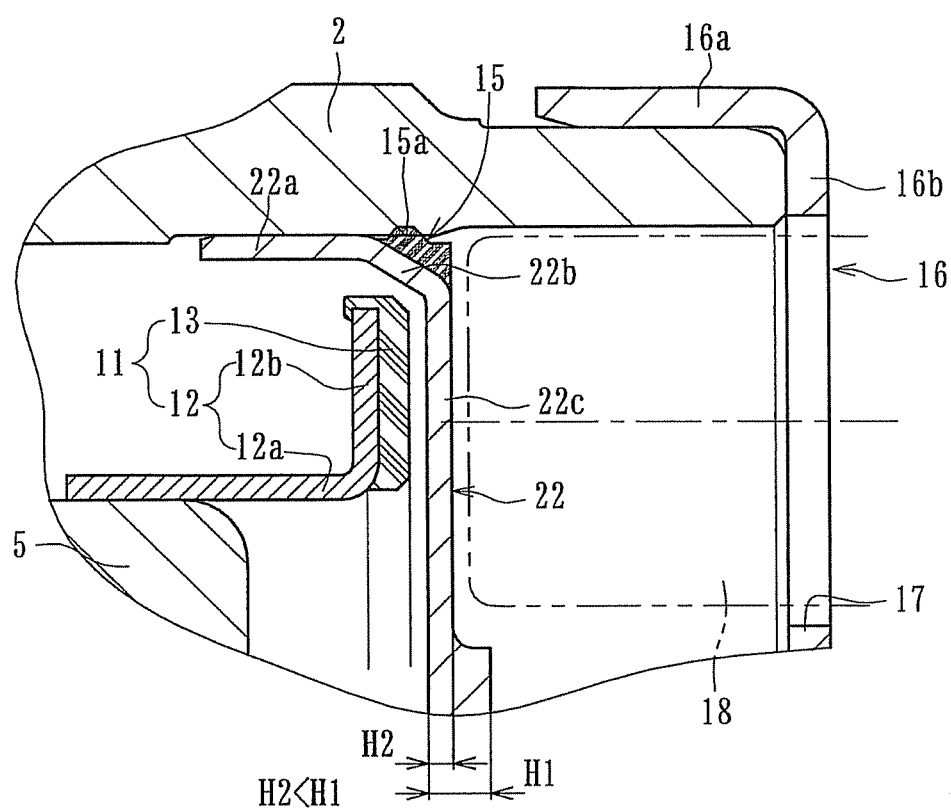
FIG. 7 is a partially enlarged view of a modification of FIG. 5.

FIG. 3 is a longitudinal-section view of a second embodiment of a wheel bearing apparatus with a rotational speed detecting apparatus taken along a line in FIG. 4. FIG. 4 is a side elevation view of FIG. 3. FIG. 5 is a partially enlarged view of a detecting portion of FIG. 3. FIG. 6 is a partially enlarged view of a drain portion of FIG. 3. FIG. 7 is a partially enlarged view of a modification of FIG. 5. In this embodiment, the same reference numerals are used to designate the same structural elements as those used in the previous embodiment.

This wheel bearing apparatus with a rotational speed detecting apparatus is a so-called "third generation" type for a driven wheel. It includes an inner member 1, an outer member 2, and double row rolling elements (balls) 3a, 3b contained between the inner and outer members 1 and 2. The inner member 1 includes the wheel hub 4 and an inner ring 5 press-fit onto the wheel hub 4.

The wheel hub 4 is integrally formed, on its outer-side end, with a wheel mount flange 6. The wheel hub outer circumference includes one inner raceway surface 4a. A cylindrical portion 4b extends from the inner raceway surface 4a, via an axially extending shaft portion 4d.

An axially extending cup-shaped recess 10 is formed on the outer-side end of the wheel hub 4. This recess 10 is formed by forging and extends near the bottom of the outer-side inner raceway surface 4a so that a wall thickness of the outer-side portion of the wheel hub 4 is substantially uniform.

The inner ring 5 is formed, on its outer circumference, with the other inner raceway surface 5a. The inner ring is press-fit onto the cylindrical portion 4b of the wheel hub 4. The inner ring is axially secured on the wheel hub 4 by a caulked portion 4c. The caulked portion 4c is formed by plastically deforming the end of the cylindrical portion 4b. This reduces the weight and size of the bearing apparatus. The rolling elements 3a, 3b are formed from high carbon chrome steel such as SUJ2 and dip hardened to their cores to have a hardness of 58 to 64 HRC.

The wheel hub 4 is made of medium-high carbon steel such as S53C including carbon of 0.40 to 0.80% by weight. It is hardened by high frequency induction hardening to have a surface hardness of 58 to 64 HRC over a region from an inner-side base 6b of the wheel mounting flange 6 to the cylindrical portion 4b including the inner raceway surface 4a. This applies a sufficient mechanical strength against the rotary bending load applied to the wheel mounting flange 6. This improves the fretting strength of the cylindrical portion 4b forming the fitting portion of the inner ring 5.

Outer member 2 is formed, on its outer circumference, with body mounting flange 2c. The outer member inner circumference includes an outer-side outer raceway surface 2a, that opposes the inner raceway surface 4a of the wheel hub 4, and an inner-side outer raceway surface 2b, that opposes the inner raceway surface 5a of the inner ring 5. Double row rolling elements 3a, 3b are contained between the outer and inner raceway surfaces. The balls 3a, 3a are rollably held by cages 7, 8. A seal 9 is mounted on the outer-side opening formed between the outer member 2 and the inner member 1. A cap 14, described below, is mounted on the inner-side opening. The seal 9 and cap 14 prevent leakage of lubricating grease sealed within the bearing and the entry of rain water or dust from the outside into the bearing.

Outer member 2 is formed of medium-high carbon steel such as S53C including carbon of 0.40 to 0.80% by weight. It is formed, on its inner circumference, with double row outer raceway surfaces 2a, 2b which are hardened by high frequency induction hardening to have a surface hardness of 58 to 64 HRC.

In this embodiment, the pitch circle diameter PCDo of the outer-side row of rolling elements 3a is set larger than the pitch circle diameter PCDi of the inner-side row of rolling elements 3b (PCDo>PCDi). The diameter do of each rolling element 3a of the outer-side row is set smaller than the diameter di of each rolling element 3b of the inner-side row (do<di). The number Zo of the outer-side row of rolling elements 3a is set larger than the number Zi of the inner-side row of rolling elements 3b (Zo>Zi). This increases the bearing rigidity of the outer-side row as compared with that of the inner-side row. Thus, this extends the life of the bearing. Although a wheel bearing is shown where the size of each rolling element is different in the outer-side row and the inner side row, it will be understood that same size of rolling elements can be used in both rows.

The pulser ring 11 is press-fit onto the outer circumference of the inner ring 5. As shown in an enlarged view of FIG. 5, the pulser ring 11 includes an annular supporting member 12 and the magnetic encoder 13. The magnetic encoder 13 is integrally adhered to the inner-side surface of the annular supporting member 12 via vulcanized adhesion.

The inner-side opening of the outer member 2 is closed by the cap 14. The cap 14 is press-fit into the inner circumference of inner-side end of the outer member 2. In order to prevent the detecting performance of the rotational speed sensor 18 from being adversely effected by the cap 14, the cap is formed from non-magnetic steel sheet such as austenitic stainless steel sheet with anti-corrosion properties where a preserving film is formed by cation electro-deposition. The cap 14 includes a cylindrical fitting portion 14a, a disk portion 14c and a bottom portion 14e. The cylindrical fitting portion 14a is press-fit into the inner circumference of the inner-side end of the outer member 2. The disk portion 14c extends radially inward from the fitting portion 14a, via a radially reducing portion 14b, and opposes the magnetic encoder 13, via a small axial gap. The bottom portion 14e extends from the disk portion 14c, via the bent portion 14d, to cover the inner-side end of the inner member 1 (see FIG. 3).

In this embodiment, an elastic member 15, of synthetic rubber such as NBR, is integrally adhered, by vulcanizing adhesion, to the radially reducing portion 14b of the cap 14. The elastic member 15 has an annular projection 15a projecting radially outward from the fitting portion 14a. Thus, the annular projection 15a does not project toward the inner-side from the side of the disk portion 14c not so as to interfere with the rotational speed sensor 18. The fitting surface of the inner circumference of the inner-side end of the outer member 2 is formed so that the amplitude of chatter vibration in machining is limited to 3 μm or less. The annular projection 15a is elastically deformed and tightly contacts the end inner circumference of the outer member 2 when the projection 15a is press-fit to improve the sealability of the fitting portion 14a.

A sensor cap 16 is further mounted on the outer member 2 at an inner-side position from the cap 14. The sensor cap 16 is press-formed from austenitic stainless steel sheet with anti-corrosion properties. It has a cup-shaped configuration where preserving treatment, such as cation electro-deposition, is performed. The sensor cap 16 includes the cylindrical fitting portion 16a fit onto the outer circumference of the inner-side end of the outer member 2. The bottom portion 16b closely contacts the inner-side end face of the outer member 2.

As shown in FIG. 4, the bottom portion 16b of the sensor cap 16 is formed with the insert aperture 17 at a horizontal position corresponding to the magnetic encoder 13. The rotational speed sensor 18 is inserted into the insert aperture 17. This suppresses the variation of the air gap between the rotational speed sensor 18 and the magnetic encoder 13 if relatively inclined conditions, between the outer and inner members 2, 1, are caused due to a lateral load applied by a wheel. Thus, this obtains stable detecting accuracy.

In this embodiment, a drain 21 is formed on the bottom portion 16b of the sensor cap 16 at a radially outer position (see FIGS. 4 and 6). The drain 21 is formed at a corner between the fitting portion 16a and the bottom portion 16b nearest to the ground. This makes it possible to effectively discharge foreign matter, such as rain water etc., that would enter into the inside of the sensor cap 16. Although a rectangular aperture is illustrated as the drain 21, other configurations, such as ellipse etc., may be selected.

FIG. 7 shows a modification of FIG. 5. This modification is basically different only in the configuration of the cap 14. Thus, its detailed description will be omitted. The same reference numerals are used to designate the same structural element.

According to this modification, the inner-side opening of the outer member 2 is closed by a cap 22. In order to prevent the detecting performance of the rotational speed sensor 18 from being adversely effected by the cap 22, the cap 22 is formed from non-magnetic steel sheet, such as austenitic stainless steel sheet, with anti-corrosion properties. The cap has a cup-shaped configuration. The cap 22 includes a cylindrical fitting portion 22a and a disk portion 22c. The cylindrical fitting portion 22a includes an elastic member 15 of synthetic rubber press-fit into the inner circumference of the inner-side end of the outer member 2. The disk portion 22c extends radially inward from the fitting portion 22a, via a radially reducing portion 22b.

In addition, the sheet thickness H2 of a region from the fitting portion 22a to the disk portion 22c is formed thinner than the sheet thickness H1 of the other portions. More particularly, the sheet thickness H2 at least of the disk portion 22c of the cap 22 is 0.2 to 1.0 mm. The sheet thickness H1 of the other portions is 1.0 to 1.5 mm. This enables the air gap to be set smaller. Thus, this improves the detecting accuracy. In this case, if the sheet thickness H2 is less than 0.2 mm, it would be difficult to exactly form the configuration of the disk portion 22c. If the sheet thickness H2 exceeds 1.0 mm, the air gap would be too large to obtain desirable magnetic properties and exact detection.

Figure 8:
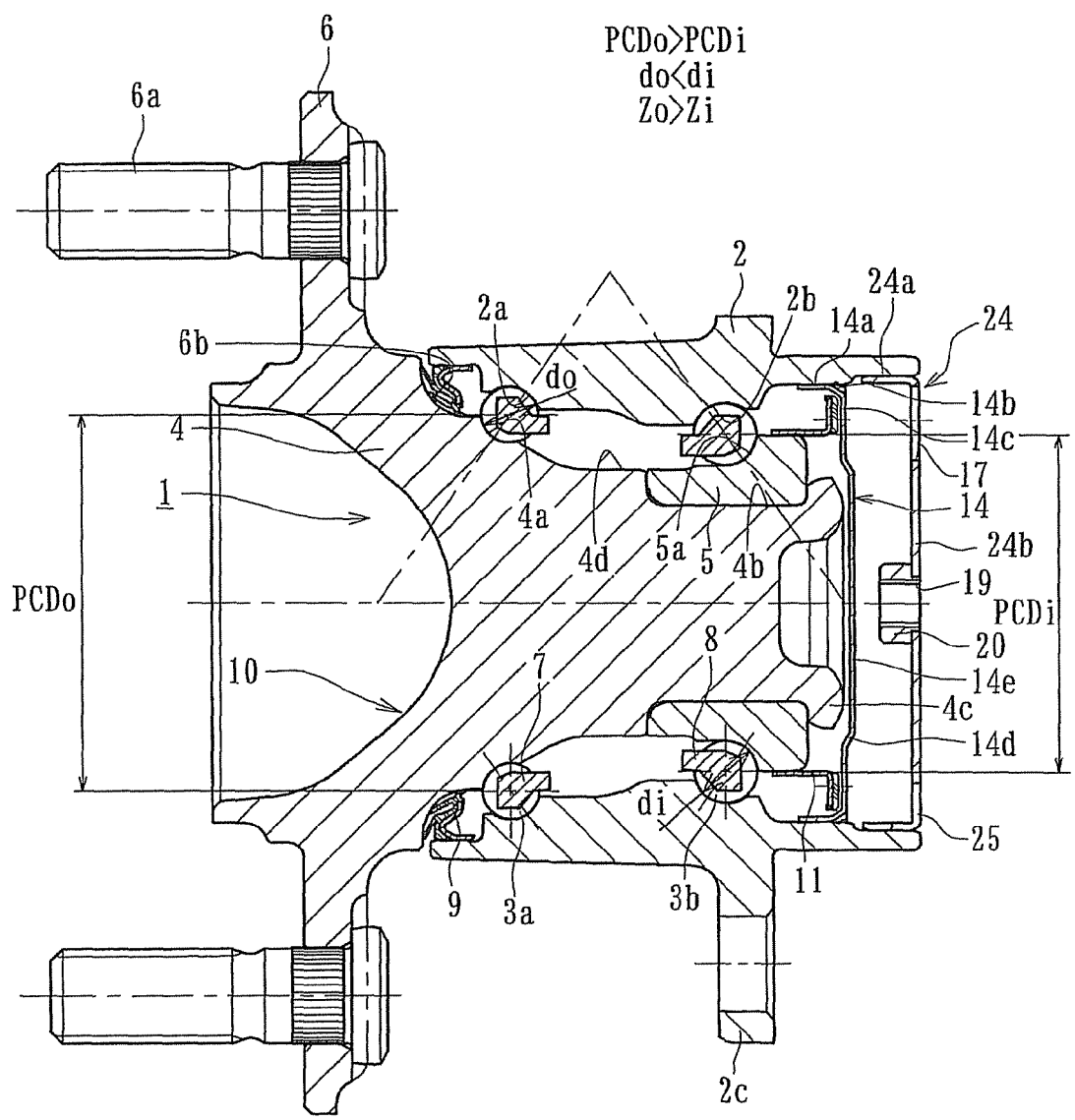
FIG. 8 is a longitudinal-section view of a third embodiment of a wheel bearing apparatus with a rotational speed detecting apparatus.
Figure 9:
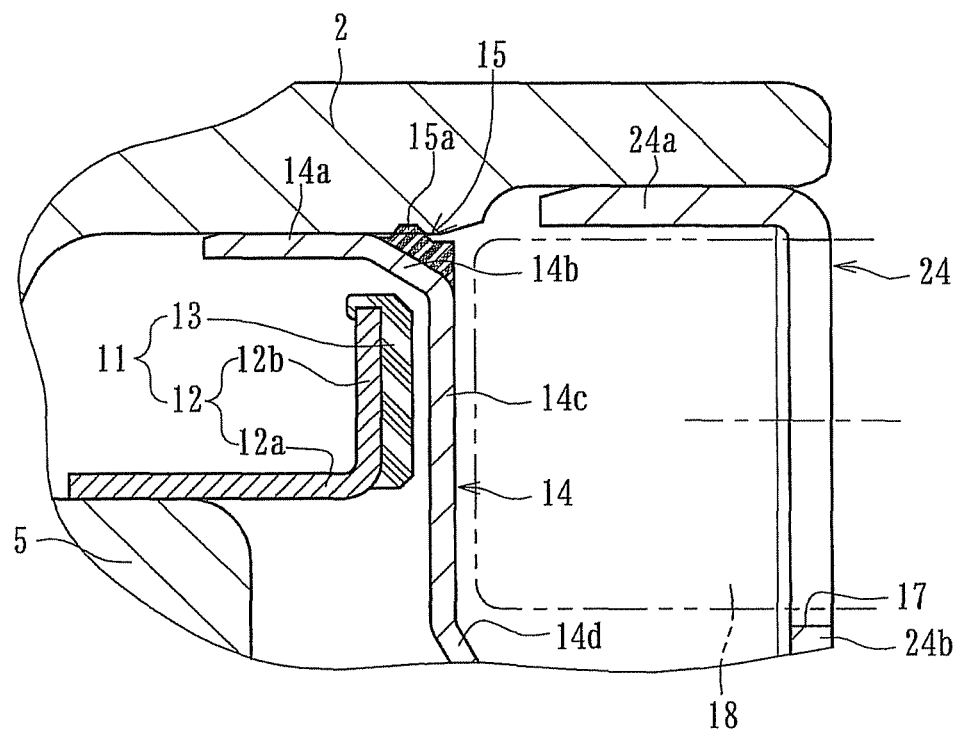
FIG. 9 is a partially enlarged view of a detecting portion of FIG. 8.
Figure 10:
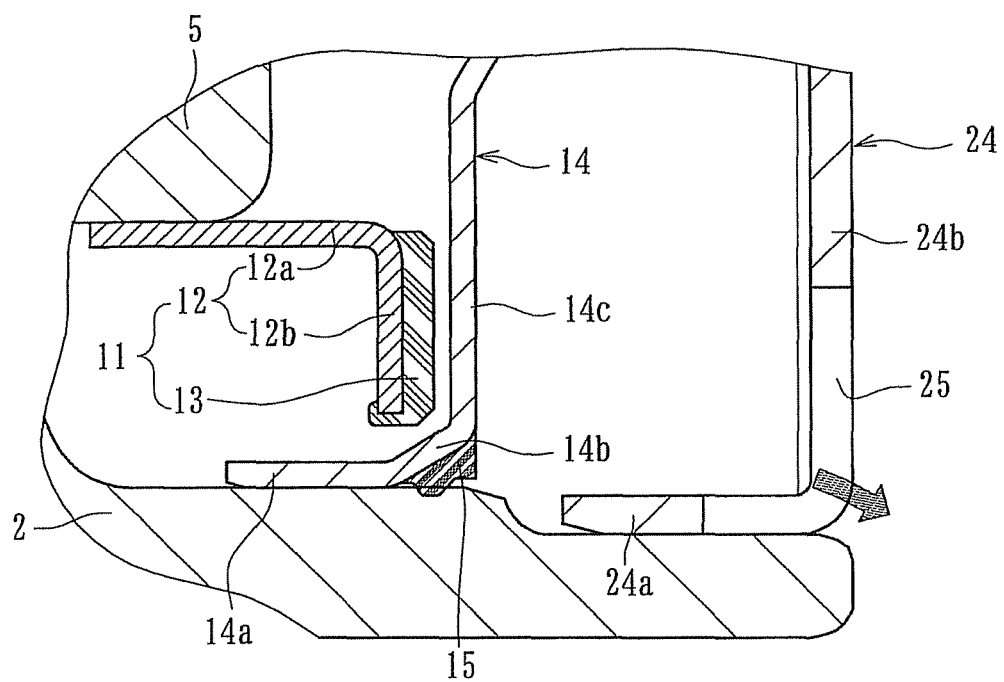
FIG. 10 is a partially enlarged view of a drain portion of FIG. 8.

FIG. 8 is a longitudinal-section view of a third embodiment of a wheel bearing apparatus with a rotational speed detecting apparatus. FIG. 9 is a partially enlarged view of a detecting portion of FIG. 8. FIG. 10 is a partially enlarged view of a drain portion of FIG. 8. This embodiment is basically different from the second embodiment (FIG. 3) only in the structure of the sensor cap 24. Thus, its detailed description will be omitted and the same reference numerals are used to designate the same structural element.

This sensor cap 24 is press-fit into the inner circumference of the inner-side end of the outer member 2. The sensor cap 24 is press-formed from austenitic stainless steel or cold rolled steel sheet where a preserving treatment, such as cation electro-deposition or zinc deposition is performed. The sensor cap 24 includes a cylindrical fitting portion 24a and a bottom portion 24b. The cylindrical fitting portion 24a is fit on the inner circumference of the inner-side end of the outer member 2. The bottom portion 24b closely contacts the inner-side end face of the outer member 2 and is substantially flush with it. A securing nut 20 is press-fit into the bottom portion 24b at or near the center. According to this embodiment, the sensor cap 24 is press-fit into the inner circumference of the outer member 2. Thus, it is possible to increase the rigidity of the sensor cap 24 when compared with the outer circumference press-fit type where the sensor cap is press-fit onto the outer circumference of the inner-side end of the outer member. Thus, this prevents the sensor cap 24 from being deformed or damaged by pebbles during running of a vehicle.

As shown in the enlarged view of FIG. 9, the bottom portion 24b of the sensor cap 24 is formed with the insert aperture 17. The position of the insert aperture corresponds the magnetic encoder 13. The rotational speed sensor 18 is inserted into the insert aperture 17. As shown in the enlarged view of FIG. 10, a drain 25 is formed on the bottom portion 24b of the sensor cap 24 at its radially outer position. The drain 25 is formed at a corner between the fitting portion 24a and the bottom portion 24b nearest to the ground. This makes it possible to effectively discharge foreign matter, such as rain water etc., that would enter into the inside of the sensor cap 24.

Figure 11:
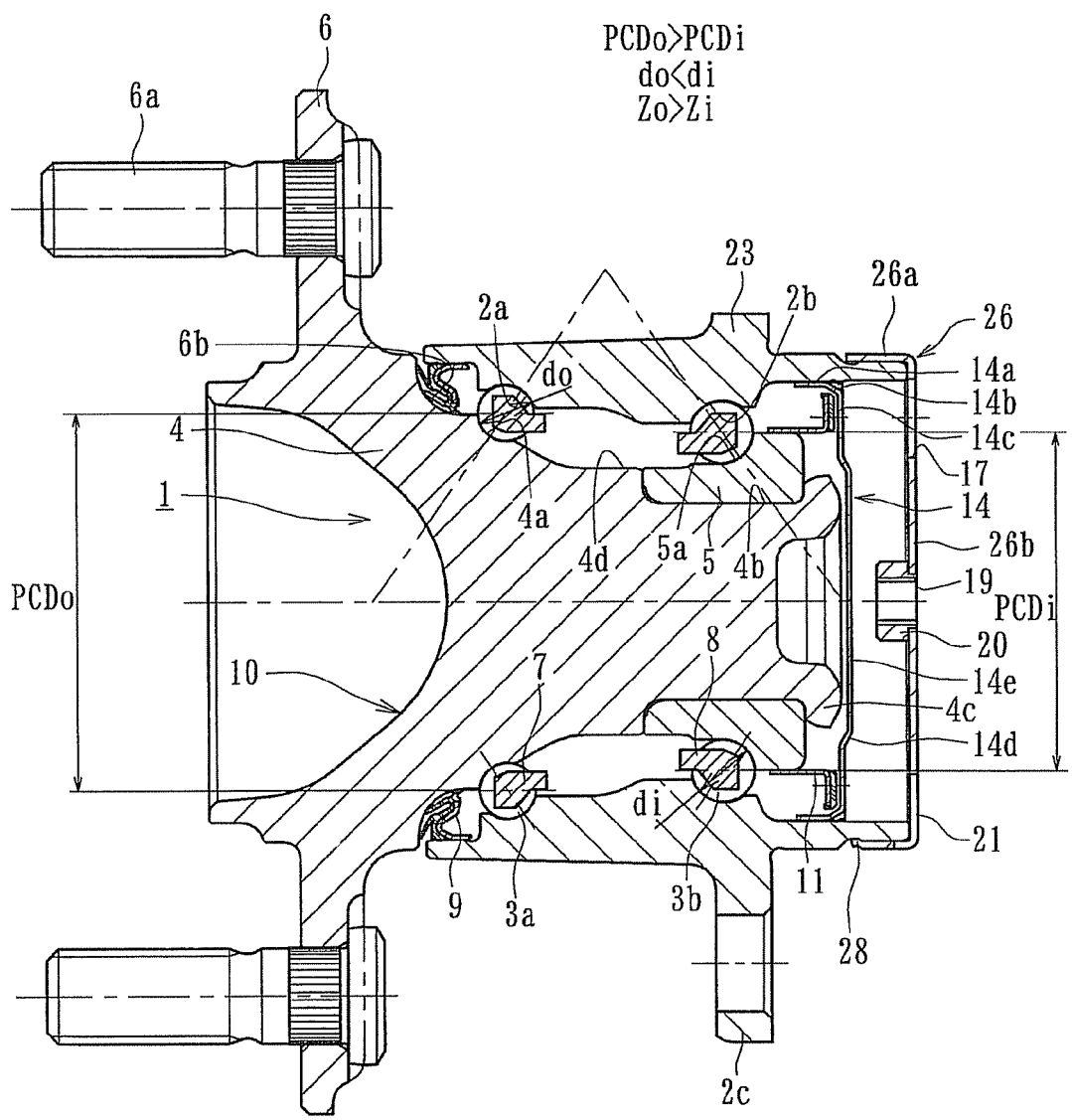
FIG. 11 is a longitudinal-section view of a fourth embodiment of a wheel bearing apparatus with a rotational speed detecting apparatus.
Figure 12:
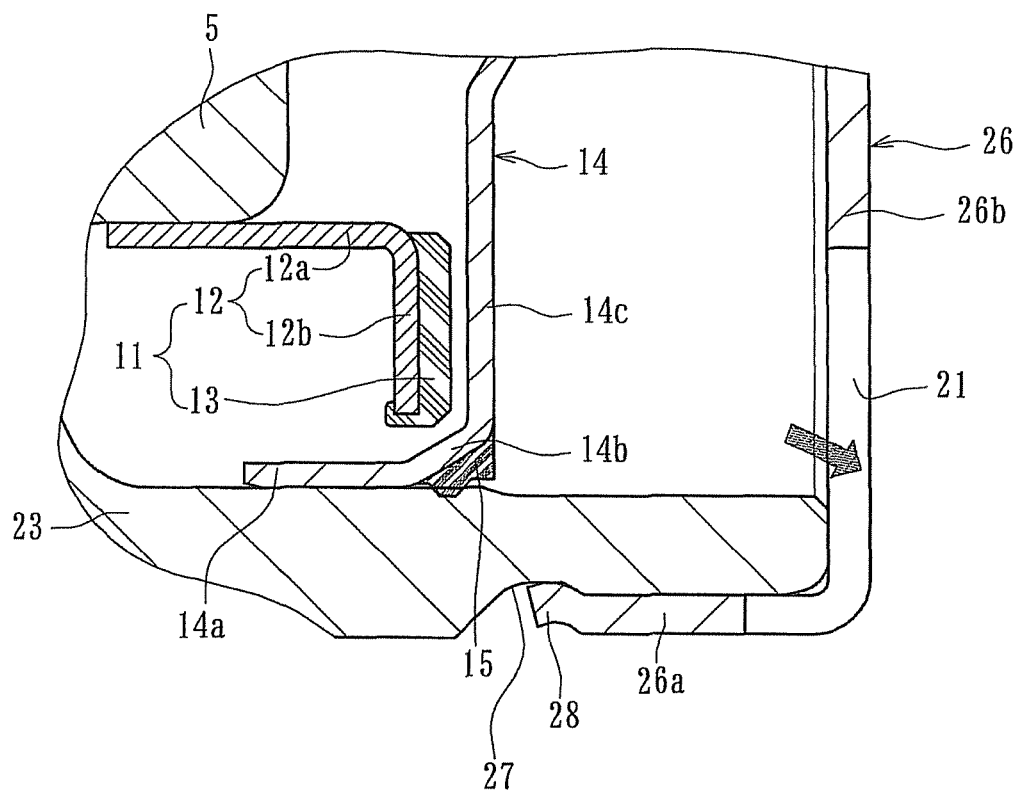
FIG. 12 is a partially enlarged view of a drain portion of FIG. 11.
Figure 13:
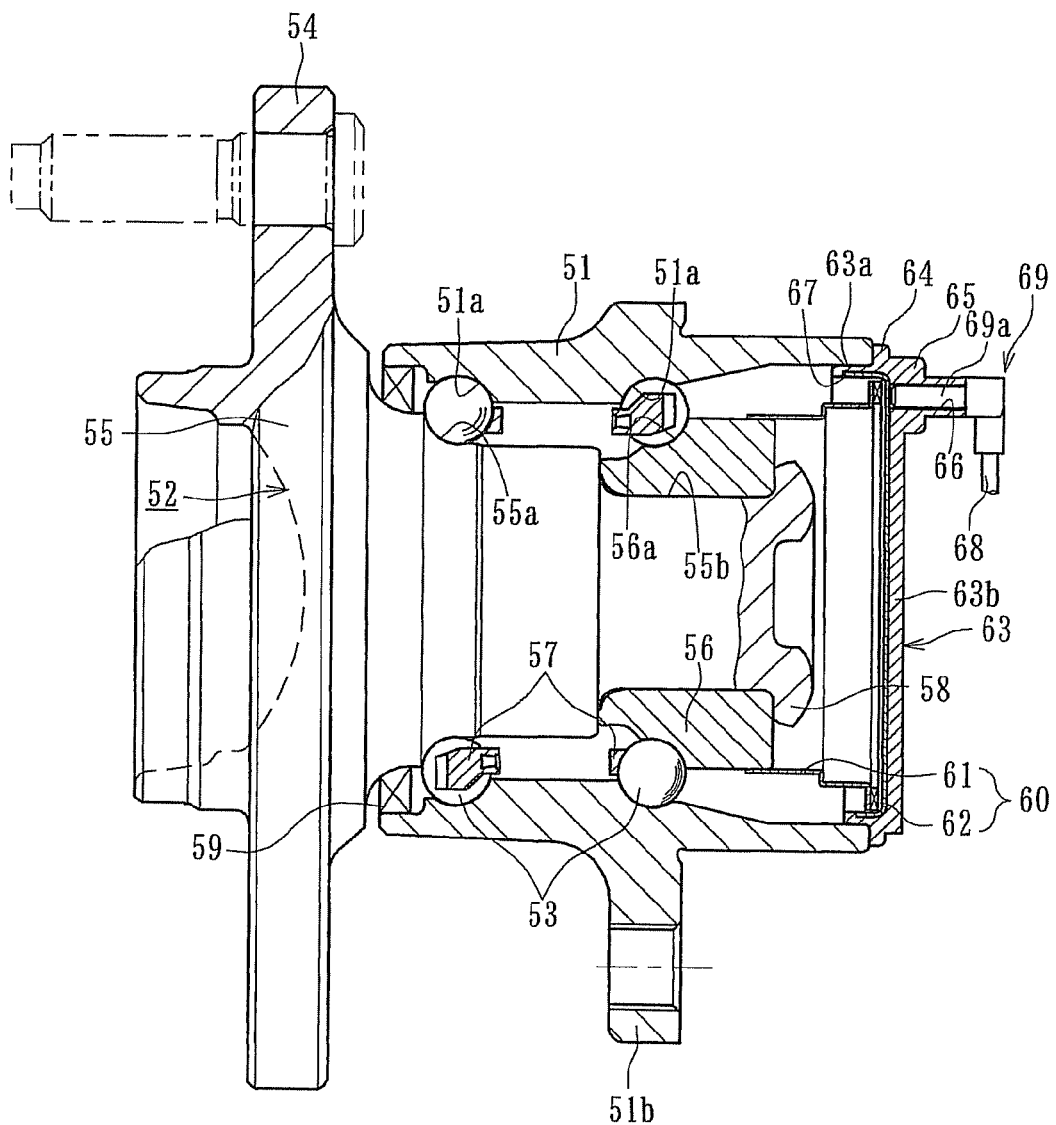
FIG. 13 is a longitudinal-section view of a prior art wheel bearing apparatus with a rotational speed detecting apparatus.
Figure 14:
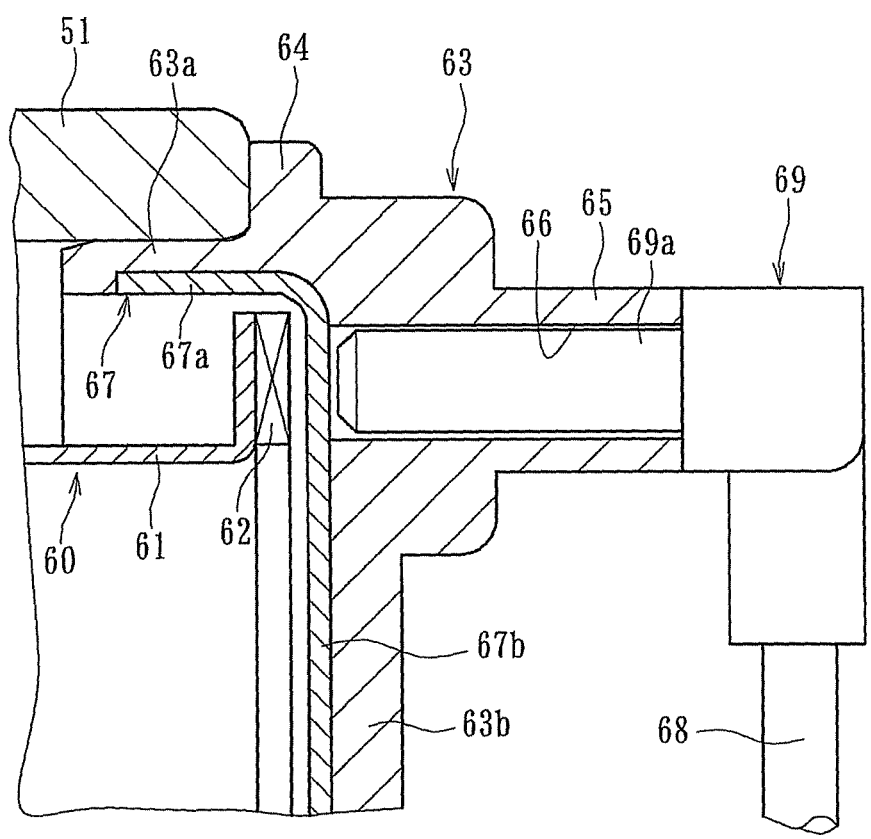
FIG. 14 is a partially enlarged view of FIG. 13.

FIG. 11 is a longitudinal-section view of a fourth embodiment of a wheel bearing apparatus with a rotational speed detecting apparatus. FIG. 12 is a partially enlarged view of a drain portion of FIG. 11. This embodiment is basically different from the second embodiment (FIG. 3) only in the structure of the sensor cap 26. Thus, its detailed description will be omitted and the same reference numerals are used to designate the same structural element.

The sensor cap 26 is press-fit onto the outer circumference of the inner-side end of an outer member 23. The sensor cap 26 is press-formed from austenitic stainless steel where a preserving treatment, such as cation electro-deposition, is performed. The cap 26 has a cup shaped configuration. The cap 26 includes a cylindrical fitting portion 26a and a bottom portion 26b. The cylindrical fitting portion 26a is fit onto the outer circumference of the inner-side end of the outer member 23. The bottom portion 26b closely contacts the inner-side end face of the outer member 23. The securing nut 20 is press-fit into the bottom portion 26b at or near the center.

As shown in the enlarged view of FIG. 12, a drain 21 is formed on the bottom portion 26b of the sensor cap 26 at its radially outer position. In addition according to this embodiment, an annular groove 27 is formed on the outer circumference of the inner-side end of the outer member 23. The sensor cap 26 is press-fit onto the outer circumference of the outer member 23. The outer-side end of the fitting portion 26a is caulked into the annular groove 27 by forming a caulked portion 28. This prevents the sensor cap 26 from axially slipping off from the outer member 23. Also, it keeps the original air gap. The amount of deformation at the fitting portion of the outer member, due to the input load from the wheel, becomes larger in the thin area of the outer member. This fact is unfavorable to prevent the member from axially slipping off. However, the caulking of the sensor cap increases the fastening force of the sensor cap 26. Thus, this contributes to a reduction of thickness of the outer member 23 and accordingly a weight reduction of whole the bearing apparatus.

The present disclosure can be applied to any type of wheel bearing apparatus with a rotational speed detecting apparatus for a driven wheel type and an inner ring rotation type using balls or tapered rollers as rolling elements.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus with a rotational speed detecting apparatus comprising:
   an outer member integrally formed with a body mounting flange on its outer circumference, the body mounting flange is to be mounted on a knuckle, the outer member having an outer member inner circumference that includes double row outer raceway surfaces;
   an inner member includes a wheel hub and at least one inner ring, the wheel hub is integrally formed with a wheel mounting flange, a cylindrical portion axially extends from the wheel mounting flange, the inner ring is press-fit onto the cylindrical portion of the wheel hub, the inner member is formed with double row inner raceway surface on its outer circumference, the double row inner raceway surfaces oppose the double row outer raceway surfaces;
   double row rolling elements are contained between the inner raceway surfaces and outer raceway surfaces of the inner member and outer member;
   a pulser ring is adapted to be fit onto an outer circumference of the inner ring, the pulser ring has magnetic characteristics alternately and equidistantly varying along its circumferential direction;
   a sensor cap is press-formed from austenitic stainless steel sheet, coated by cation electro-deposition, and fit onto an inner-side end of the outer member;
   a rotational speed sensor is mounted on the sensor cap at a radially outer position, the rotational speed sensor is arranged opposite to the pulser ring, via a predetermined first axial air gap;
   a cup-shaped cap is subject to a phosphoric zinc treatment and is coated by preserving film formed by cation electro-deposition, the cup-shaped cap is mounted onto the outer member, the cup-shaped cap is press-formed of austenitic stainless steel sheet, the cup-shaped cap further comprises a cylindrical fitting portion, a disk portion, and a bottom portion, the cylindrical fitting portion is press-fit into the inner circumference of the inner-side end of the outer member, the disk portion extends radially inward from the fitting portion and opposes the pulser ring, via a second axial gap, the bottom portion extends from the disk portion, via a bent portion, to cover the inner-side end of the inner member; and the rotational speed sensor is arranged opposite to the pulser ring, facing the disk portion of the cup-shaped cap, where the rotational speed sensor is adjacent to the disk portion.

2. The wheel bearing apparatus with a rotational speed detecting apparatus of claim 1, wherein an elastic member of synthetic rubber is integrally adhered, by vulcanized coating, to an outer circumferential surface of the fitting portion of the cup-shaped cap.

3. The wheel bearing apparatus with a rotational speed detecting apparatus of claim 1, wherein a sheet thickness at least of the disk portion of the cup-shaped cap is thinner than the sheet thickness of the other portions.

4. The wheel bearing apparatus with a rotational speed detecting apparatus of claim 1, wherein a third air gap between the cup-shaped cap and the rotational speed sensor is set in a range of 0.3 to 1.0 mm.

5. The wheel bearing apparatus with a rotational speed detecting apparatus of claim 1, wherein the sensor cap further comprises a cylindrical fitting portion and a bottom portion, the cylindrical fitting portion is fit onto the inner side end of the outer member, the bottom portion extends radially inward from the fitting portion to be in contact with an inner-side end face of the outer member, and the bottom portion is formed with an insert aperture which receives the rotational speed sensor which is detachably mounted.

6. The wheel bearing apparatus with a rotational speed detecting apparatus of claim 5, wherein the fitting portion of the sensor cap is press-fit onto the outer circumference of the inner-side end of the outer member, and an annular groove is formed on the outer circumference of the inner-side end of the outer member, an outer-side end of the fitting portion is caulked onto the annular groove.

7. The wheel bearing apparatus with a rotational speed detecting apparatus of claim 5, wherein the sensor cap is formed of austenitic stainless steel sheet having anti-corrosion properties.

8. The wheel bearing apparatus with a rotational speed detecting apparatus of claim 5, wherein a drain is formed on the sensor cap at a corner between the fitting portion and the bottom portion.

9. The wheel bearing apparatus with a rotational speed detecting apparatus of claim 5, wherein an aperture is formed on the bottom portion of the sensor cap at or substantially center and a securing nut is press-fit into the aperture from the outer-side of the bottom portion, and the rotational speed sensor is secured by fastening a mounting bolt into the securing nut.

10. The wheel bearing apparatus with a rotational speed detecting apparatus of claim 1, wherein the pitch circle diameter (PCDo) of the outer-side row of rolling elements is set larger than the pitch circle diameter (PCDi) of the inner-side row of rolling elements, a diameter (do) of each rolling element of the outer-side row is set smaller than a diameter (di) of each rolling element of the inner-side row, and wherein a number (Zo) of the outer-side row of rolling element is set larger than a number (Zi) of the inner-side row of rolling element.

* * * * *

UNITED STATES PATENT AND TRADEMARK OFFICE
CERTIFICATE OF CORRECTION

Page 1 of 1

PATENT NO. : 9,056,523 B2
APPLICATION NO. : 13/894632
DATED : June 16, 2015
INVENTOR(S) : Takayuki Norimatsu It is certified that error appears in the above-identified patent and that said Letters Patent is hereby corrected as shown below:

In the specification

<u>Column 10</u>
Line 37 after "line", insert -- III-III --.

Signed and Sealed this
Twenty-second Day of December, 2015

Michelle K. Lee
*Director of the United States Patent and Trademark Office*